(12) United States Patent
Buchheit (10) Patent No.: US 8,520,026 B1
(45) Date of Patent: Aug. 27, 2013

(54) CYCLING THROUGH AN ORDERED SEQUENCE OF CONTENT BY ROTATING DIGITAL OBJECTS

(76) Inventor: Brian K. Buchheit, Davie, FL (US)

( * ) Notice: Subject to any disclaimer, the term of this patent is extended or adjusted under 35 U.S.C. 154(b) by 0 days.

(21) Appl. No.: 13/567,501

(22) Filed: Aug. 6, 2012

Related U.S. Application Data

(63) Continuation of application No. 11/468,180, filed on Aug. 29, 2006, now Pat. No. 8,259,132.

(51) Int. Cl.
*G09G 5/00* (2006.01)
(52) U.S. Cl.
USPC ......................................................... 345/619
(58) Field of Classification Search
None
See application file for complete search history.

(56) References Cited

U.S. PATENT DOCUMENTS

| | | | |
|---|---|---|---|
| 6,266,098 B1* | 7/2001 | Cove et al. | 348/563 |
| 6,374,207 B1* | 4/2002 | Li et al. | 703/27 |
| 2002/0129369 A1* | 9/2002 | Kamen | 725/47 |

* cited by examiner

*Primary Examiner* — Edward Martello
(74) *Attorney, Agent, or Firm* — Patents On Demand P.A.; Brian K. Buchheit; Scott M. Garrett (57) ABSTRACT

In one embodiment, one of a set of M content items is displayed within a display graphic element of a graphical user interface. A sequential ordering exists among the set of M content items. A rotation of a digital object along a directional axis is detected. The digital object has N sides along the directional axis. A quantity of M is different from a quantity of N. In response to the detected rotation, different ones of the M content items are displayed within the display graphic element in accordance with the sequential ordering. Each sequential increment of the N sides per the rotation results in a corresponding sequential increment through the set of M content items.

30 Claims, 5 Drawing Sheets

CYCLING THROUGH AN ORDERED SEQUENCE OF CONTENT BY ROTATING DIGITAL OBJECTS

CROSS-REFERENCE TO RELATED APPLICATIONS

This continuation application claims the benefit of U.S. patent application Ser. No. 11/468,180 now U.S. Pat. No. 8,259,132 filed 29 Aug. 2006 entitled "ROTATIONALLY DEPENDENT INFORMATION IN A THREE DIMENSIONAL GRAPHICAL USER INTERFACE. Pending U.S. patent application Ser. No. 13/568,304 also claims the benefit of U.S. Pat. No. 8,259,132. The entire contents of U.S. application Ser. No. 11/468,180 are incorporated by reference herein.

BACKGROUND

The present invention relates to the field of information presentation and human-to-machine interfaces and, more particularly, to cycling through an Ordered Sequence of content by rotating digital objects.

The presentation of information is a crucial component of business that is often underappreciated. Most software applications present information obtained from an electronic space using a visual modality, sometimes supplemented with an alternative audio presentation of the information. A series of tools have been developed to facilitate the presentation and user selection manipulation of information. Conventional interface tools include, for example, hot-keys, menus, toolbars, pop-up command lists, mouse clicks, and the like. Together, these tools facilitate user interaction with the information in the electronic space. However, the majority of existing tools are severely limited in the ways in which they display information.

The primary limitation to these software tools is the manner in which information can be displayed without losing logical continuity, display area, and integrity. For example, a popular method for displaying information is through pop-up windows. With pop-up windows, as the number of user activated pop-up windows increases, the amount of visible display area decreases. Soon, the pop-up windows clutter the interface and obscure the information that is being displayed. Also, a use of too many pop-up windows can degrade system performance, since each window can consume computing resources.

Another problem with many existing implementations is that the tool functions in an expected and linear manner. That is, the elements act in a way that is consistent with a physical reality. For example, selecting the forward-facing or "next" button displays the subsequent page of a numeric sequence. Additionally, the amount of information that can be displayed is limited by the quantity of available space of the object. For example, the amount of information contained in a book is limited by the number of pages it contains and each page can only display two sides of information.

To cope with these shortcomings, many tools have become overly complex and cumbersome. Users are forced to use these limited, cluttered, and complex tools without a reasonable alternative. Worse, few standards exist, as each attempted method has many flaws, so tool users are often forced to learn new interface tools for each software application that they use.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Embodiments of the present invention discloses a method for displaying of information that need not be bound by conventional relationships between digital objects visually presented on a display and corresponding physical analogs for these digital objects. The invention assumes that the physical analog that is being digitally represented is a solid object having sides of the same basic shape regardless of rotation. An example of such an object is a book. Although not all sides of the book are equivalent in dimensions, all are quadrilateral in shape. Using the present invention, a digital object for the book can be rotationally overloaded. That is, using one set of rotational tools, the digital book can be treated like its physical analog. Using another set of rotational tools with the book, the physical analogy can be severed and additional information can be presented. For example, the digital book can be rotated upwards to provide a set of user selectable commands related to the book.

Embodiments of the present invention can be implemented in accordance with numerous aspects consistent with material presented herein. For example, one aspect of the present invention can include a method for presenting digital objects in an electronic space that corresponds to a physical analog having N sides along a directional axis. The digital object can be rotated in an electronic space along the directional axis. A visual rendering of the rotated object is presented within a display, with a number of sides different than N.

Another aspect of the present invention can include a method for presenting digital objects within a computing interface. This computing interface includes a visual interface for displaying a digital object and user selectable rotational controls. Upon receiving a user selection to rotate the digital object along a designated axis, the interface visually renders the digital object so that a digital representation of the rotated object is approximately equivalent to a representation for a physical analog of the digital object when the physical analog is rotated in a corresponding fashion. A user selection to rotate the digital object in an alternate fashion results in an alternate digital representation for the rotated object that is not approximately equivalent to a representation for the physical analog of the digital object when the physical analog is rotated in a corresponding fashion.

Still another aspect of the present invention can include a graphical user interface (GUI). The graphical user interface can include a digital object, which is rotatable in response to a user selection, and a set of rotational controls. A combination of a selection of one of the rotational controls and a user rotation of the digital object results in the digital object being rendered in the graphical user interface in a manner approximately equivalent to a rotated view resulting from an approximately equivalent rotation of a physical analog of the digital object. Yet, a selection of a different one of the rotational controls and a user rotation of the digital object results in the digital object being rendered in the graphical user interface in a manner that is not approximately equivalent to a rotated view resulting from an approximately equivalent rotation of the physical analog of the digital object.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
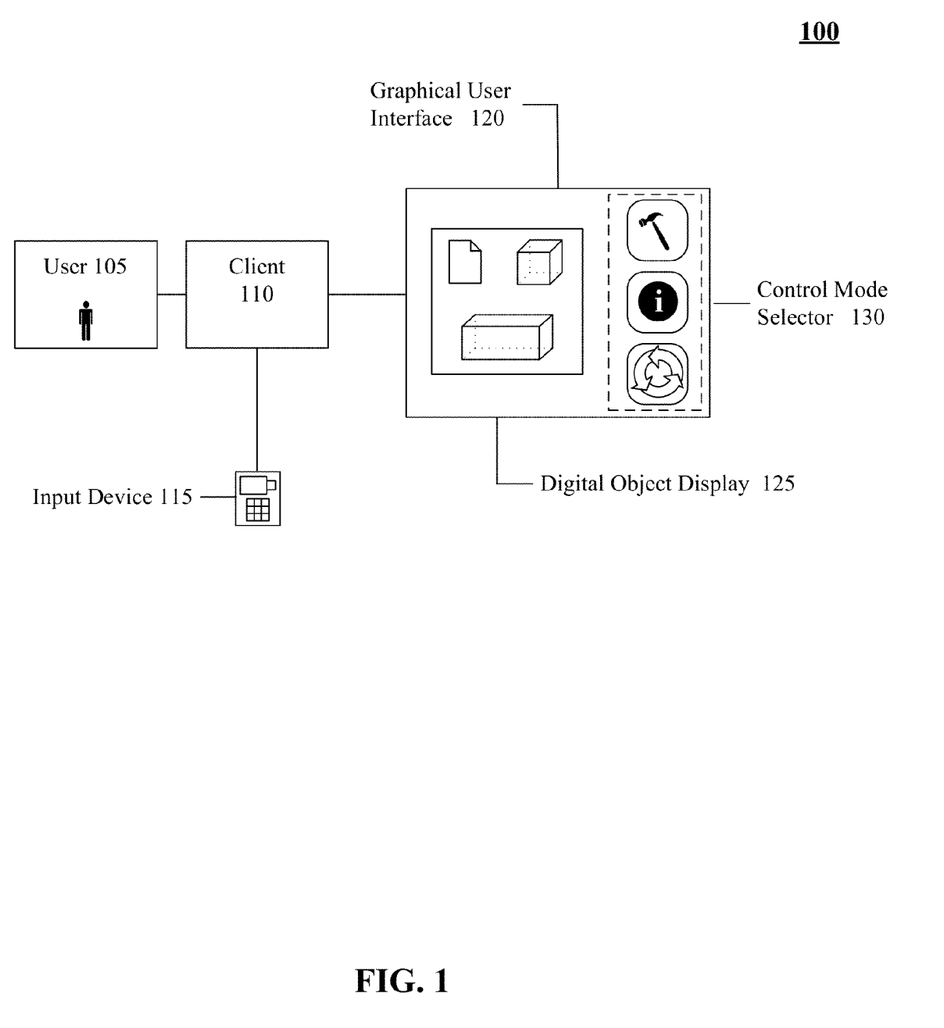
FIG. 1 is a schematic diagram of a system for displaying rotationally dependent information in accordance with an embodiment of the inventive arrangements disclosed herein.

Referring to the figures, FIG. 1 is a schematic diagram of a system 100 for displaying rotationally dependent information in accordance with an embodiment of the inventive arrangements disclosed herein. In system 100, user 105 can view rotationally dependent information via graphical user interface 120 running on client 110. User 105 interacts with graphical user interface 120 using at least one input device 115 attached to client 110. Client 110 can be any of a variety of computing devices including, but not limited to, a personal computer, a kiosk, a personal data assistant (PDA), a mobile phone, a video game device, a media player, and the like. Input device 115 can be any of a variety of input devices including, but not limited to, a keyboard, a mouse, a voice command device including an audio transducer, a keypad, and the like.

Graphical user interface 120 can include digital object display 125 and control mode selector 130. Digital object display 125 can include any of a variety of display methods that can be used within graphical user interface 120 including, but not limited to, a pop-up window, a GUI window, an applet, and the like. Control mode selector 130 can be any of a variety of selection methods that can be used within graphical user interface 120 including, but not limited to, a set of selectable buttons, a set of radio buttons, a set of checkboxes, and the like.

Note how GUI 120 can be a 3-dimensional GUI showing 3-dimensional objects, as in a first-person perspective game. Objects can be manipulated in a rotationally dependent fashion. This permits a maximizing of conveyable information in a consistent, natural way. For example, a weapon in a game shown in GUI 120 can have a rotational mode available in control mode selector 130. Selection of this mode displays weapon specifications, options, and related information. A user selection of a different mode will treat the weapon in a fashion analogous to a physical weapon.

In another example, a physical library can be represented digitally in GUI 120. The electronic books in the digital library can be selected and read in a manner that is analogous to their physical counterparts by a user. However, selection of a rotational mode and direction by a user would offer additional information not contained in the printed book. For example, an upwards rotation of a specified page displays a corresponding literary analysis. In another example, a user could highlight a word in the digital representation of the book page and select a specific mode coupled with a rotational direction resulting in the display of a dictionary entry for the highlighted word within GUI 120.

Figure 2:
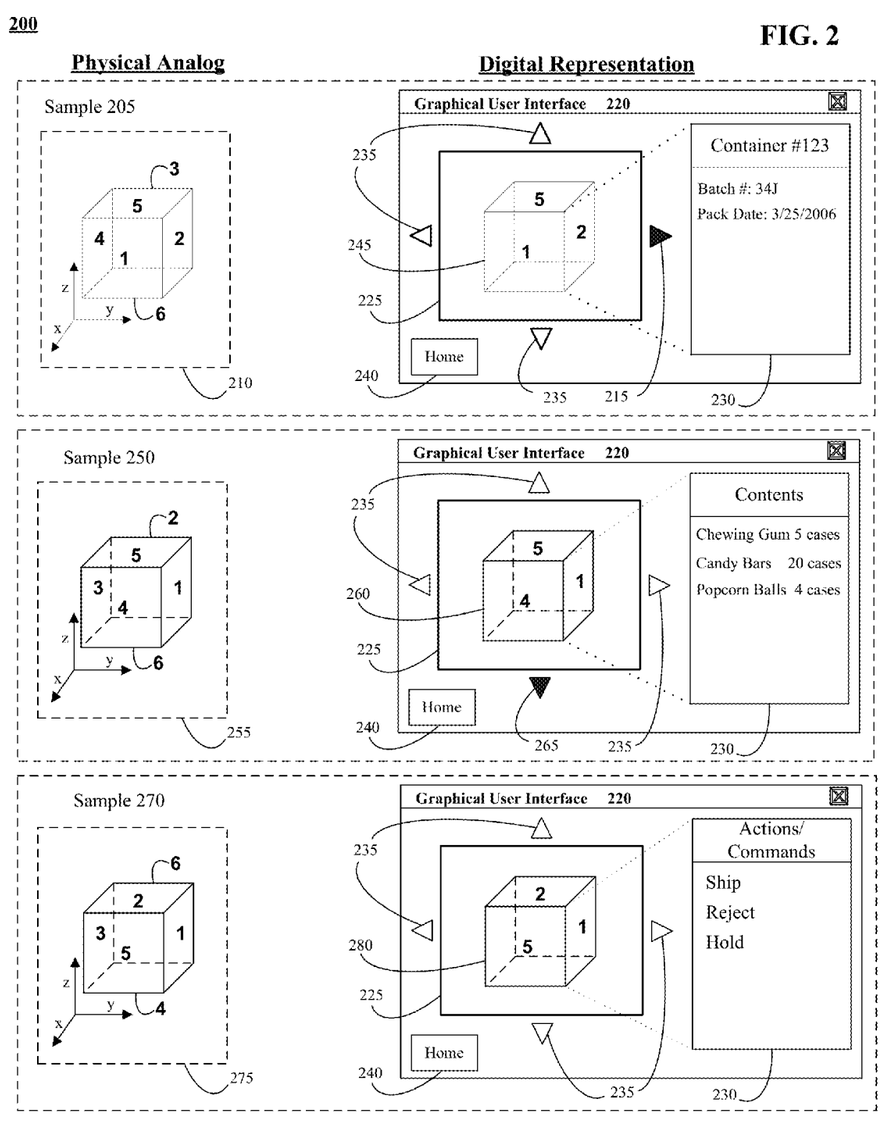
FIG. 2 illustrates a collection of successive sample user operations made upon a physical analog and their resultant digital representations in accordance with an embodiment of the inventive arrangements disclosed herein

FIG. 2 illustrates a collection 200 of successive sample user operations made upon a physical analog and their resultant digital representations in accordance with an embodiment of the inventive arrangements disclosed herein. For illustrative purposes, the physical analog corresponds to a rectangular box, comprised of six planes, such as one used for the shipping of goods. The box has four sides along a directional axis.

Sample 205 includes physical analog 210 and graphical user interface 220. The sides of physical analog 210 and digital object 245 are numbered for illustrative purposes. Graphical user interface 220 can include electronic space 225, rotational controls 235 and 215, digital object 245, data display 230, and home button 240. It should be noted that rotational control 215 is labeled and colored differently than rotational controls 235 to illustrate a user selection to produce successive results.

In this example, digital object 245 is a digital representation of physical analog 210 displayed in electronic space 225. Digital object 245 is approximately equivalent to physical analog 210, having the same shape and orientation.

As indicated by the dotted lines, the contents of data display 230 are associated with side 1 of digital object 245. It should be appreciated that the information contained in data display 230 does not necessarily exist on physical analog 210. In sample 205, data display 230 presents a user with high-level information about physical analog 210.

Selection of home button 240 by a user causes the elements of graphical user interface 220 to revert to a predetermined originating state. The selection of home button 240 supersedes the sequence of user-selected rotations.

The selection of rotational control 215 by a user results in a counter-clockwise rotation of digital object 245 along the Z-axis, in the XY-plane, as illustrated in sample 250. In this example, both digital object 260 and physical analog 255 reflect the counter-clockwise rotation; both now have side 4 in the forefront. Digital object 260 is still approximately equivalent to physical analog 255.

Likewise, the contents of data display 230 are associated with side 4 of digital object 260. It should be appreciated that the information contained in data display 230 does not exist necessarily on physical analog 255. In sample 250, data display 230 presents a user with information specific to physical analog 255. It should also be noted that rotational control 265 is labeled and colored differently than rotational controls 235 to illustrate a user selection to produce successive results. The remaining elements of graphical user interface 220 remain unchanged.

The selection of rotational control 265 by a user results in a forward rotation of digital object 260 along the 4-axis, in the YZ-plane, as illustrated in sample 270. In this example, both digital object 280 and physical analog 275 reflect the forward rotation; both now have side 5 in the forefront. Digital object 280 is still approximately equivalent to physical analog 275.

Furthermore, the contents of data display 230 are associated with side 5 of digital object 275. It should be appreciated that the information contained in data display 230 does not exist necessarily on physical analog 275. In sample 270, data display 230 presents a user with a set of commands that can be selected by a user that represent actions to be performed on physical analog 275. The remaining elements of graphical user interface 220 remain unchanged.

Figure 3:
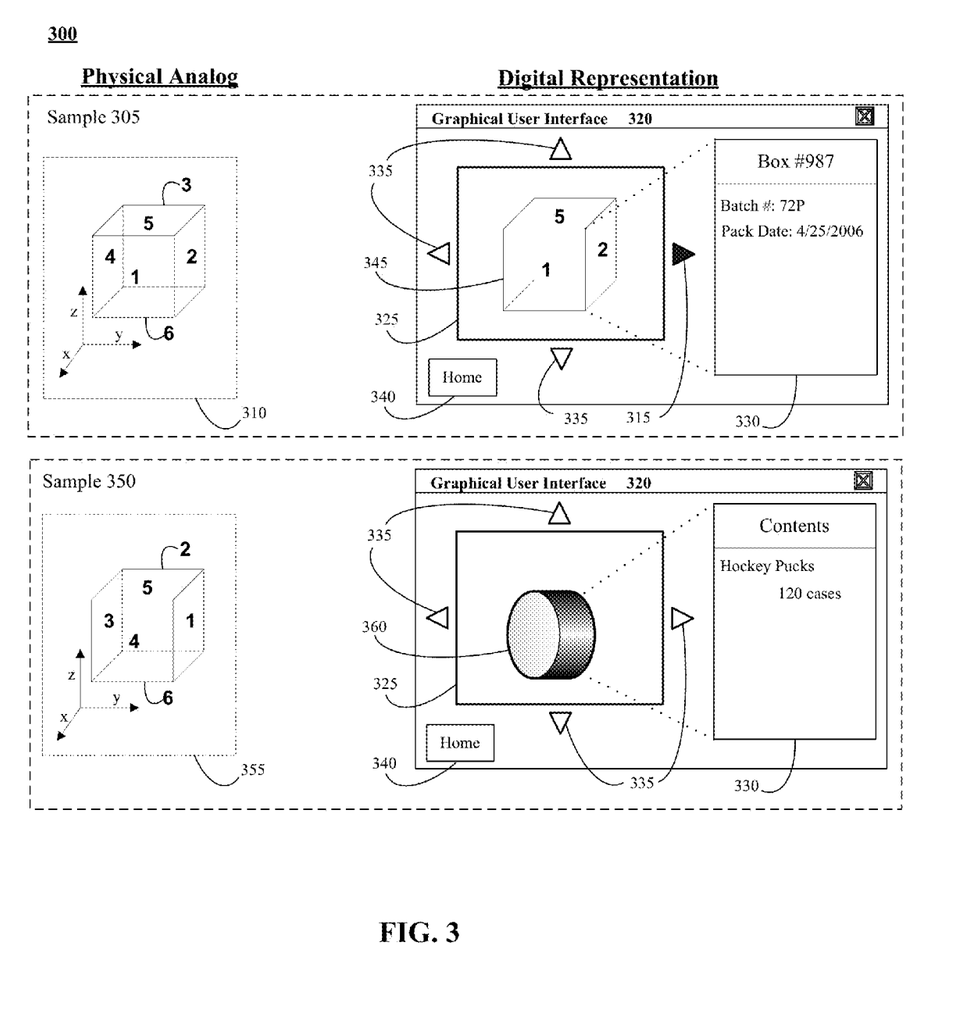
FIG. 3 illustrates a collection of successive sample user operations made upon a physical analog and their resultant digital representations in accordance with an embodiment of the inventive arrangements disclosed herein.

FIG. 3 illustrates a collection 300 of successive sample user operations made upon a physical analog and their resultant digital representations in accordance with an embodiment of the inventive arrangements disclosed herein. For illustrative purposes, the physical analog corresponds to a rectangular box, comprised of six planes, such as one used for the shipping of goods. The box has four sides along a directional axis.

Sample 305 includes physical analog 310 and graphical user interface 320. The sides of physical analog 310 and digital object 345 are numbered for illustrative purposes. Graphical user interface 320 can include electronic space 325, rotational controls 335 and 315, digital object 345, data display 330, and home button 340. It should be noted that rotational control 315 is labeled and colored differently than rotational controls 335 to illustrate a user selection to produce successive results.

In this example, digital object 345 is a digital representation of physical analog 310 displayed in electronic space 325. Digital object 345 is approximately equivalent to physical analog 310, having the same shape and orientation.

As indicated by the dotted lines, the contents of data display 330 are associated with side 1 of digital object 345. It should be appreciated that the information contained in data display 330 does not necessarily exist on physical analog 310. In sample 305, data display 330 presents a user with high-level information about physical analog 310.

Selection of home button 340 by a user causes the elements of graphical user interface 320 to revert to a predetermined originating state. The selection of home button 340 supersedes the sequence of user-selected rotations.

The selection of rotational control 315 by a user results in a rotation of digital object 345 along the Z-axis, in the XY-plane, as illustrated in sample 350. In this example, physical analog 355 reflects a counter-clockwise rotation, having side 4 in the forefront. Digital object 360 is no longer approximately equivalent to physical analog 355. The remaining elements of graphical user interface 320 remain unchanged.

This example illustrates that the result of rotating a digital object could result in another digital object. This allows for the linking of a multiplicity of objects, each with related information, within the same interface.

Figure 4:
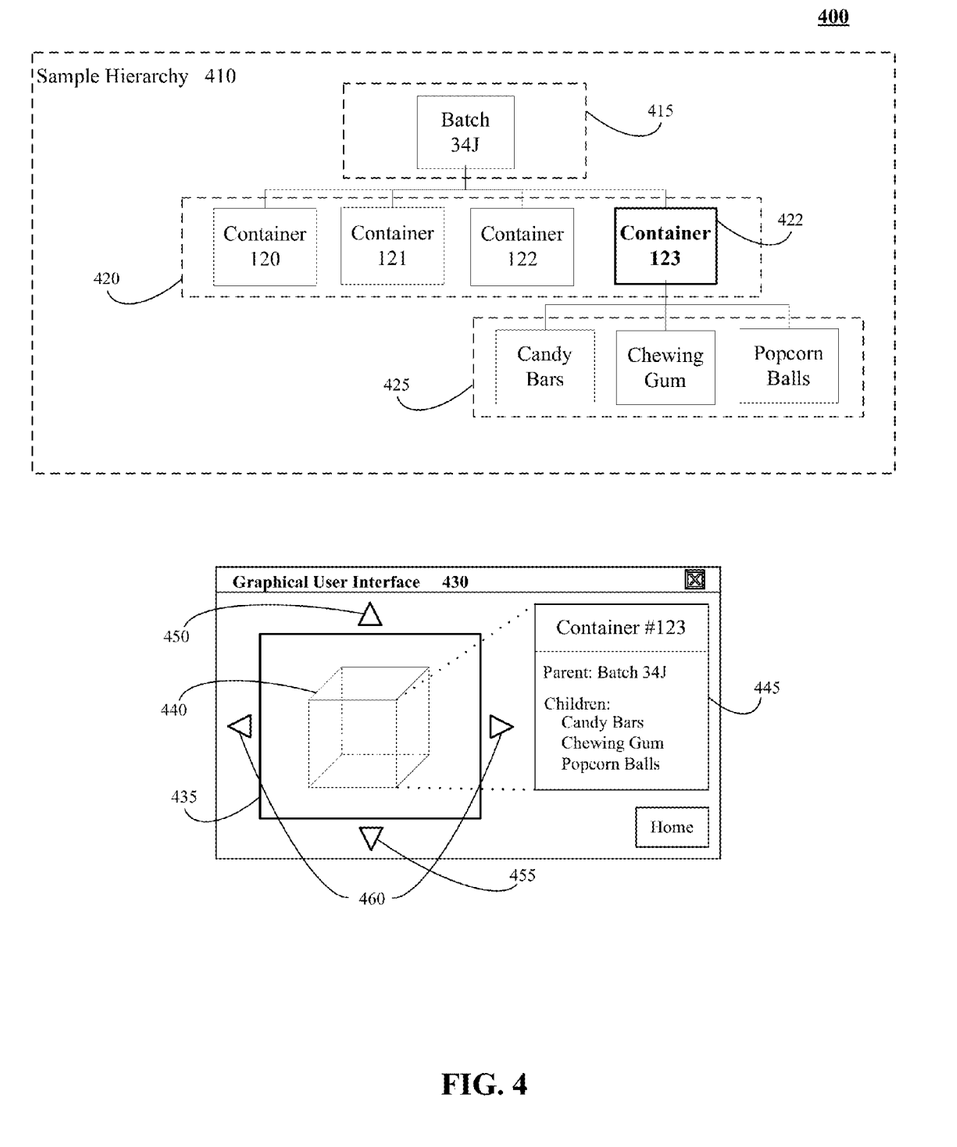
FIG. 4 is a collection of illustrations representing the display of hierarchical information within a rotationally dependent graphical user interface in accordance with an embodiment of the inventive arrangements disclosed herein.

FIG. 4 is a collection 400 of illustrations representing the display of hierarchical information within a rotationally dependent graphical user interface in accordance with an embodiment of the inventive arrangements disclosed herein. For illustrative purposes, sample hierarchy 410 illustrates the relationships between the various pieces of information displayed in system 200.

Sample hierarchy 410 includes root object 415, primary child objects 420, and secondary child objects 425. It should be noted that emboldened box 422 represents physical analog 210. The lines connecting boxes represent the relationships between the objects.

The placement of root object 415 at the top of the hierarchy means that it is the start of the information chain. Primary child objects 420 are subordinate to root object 415. The secondary child objects 425 are only subordinate to emboldened box 422 and no other members of primary child objects 420.

Graphical user interface 430 depicts the digital representation of emboldened box 422. Graphical user interface 430 can include electronic space 435, digital object 440, data display 445, upwards rotational control 450, downwards rotational control 455, and lateral rotational controls 460.

As indicated by the dotted lines, the contents of data display 445 are associated with the foremost side of digital object 440. In this example, data display 445 presents a user with information about emboldened box 422.

Upwards rotational control 450, downwards rotational control 455, and lateral rotational controls 460 are user-selectable controls that allow a user to navigate sample hierarchy 410. Selection of upwards rotational control 450 by a user would present the information of root object 415 in graphical user interface 430. Likewise, selection of downwards rotational control 455 by a user would present the information of one of the members of secondary child objects 425 in graphical user interface 430. Selection of either lateral rotational control 460 by a user would present the information of another member of primary child objects 420 in graphical user interface 430. It should be noted that the availability of rotational directions is limited by the structure of the hierarchy. In this example, if root object 415 is displayed in graphical user interface 430, then its only available rotation is downwards because it only has children objects. However, in the present representation of graphical user interface 430, emboldened object 422 has all rotational directions available because its position in the hierarchy dictates that it has parent, sibling, and child objects.

It should also be appreciated that a digital object can have a multiplicity of available interface modes, such as a hierarchy mode, a graphical mode, and a user command mode. Additionally, the availability of rotational directions and the quantity of sides available in a specified direction can be dependent on a user selected interface mode. For example, a digital object may have five upwards sides or hierarchical levels when in a hierarchy mode, four upwards sides when in a graphical mode, and three upwards sides when in a command mode.

Figure 5:
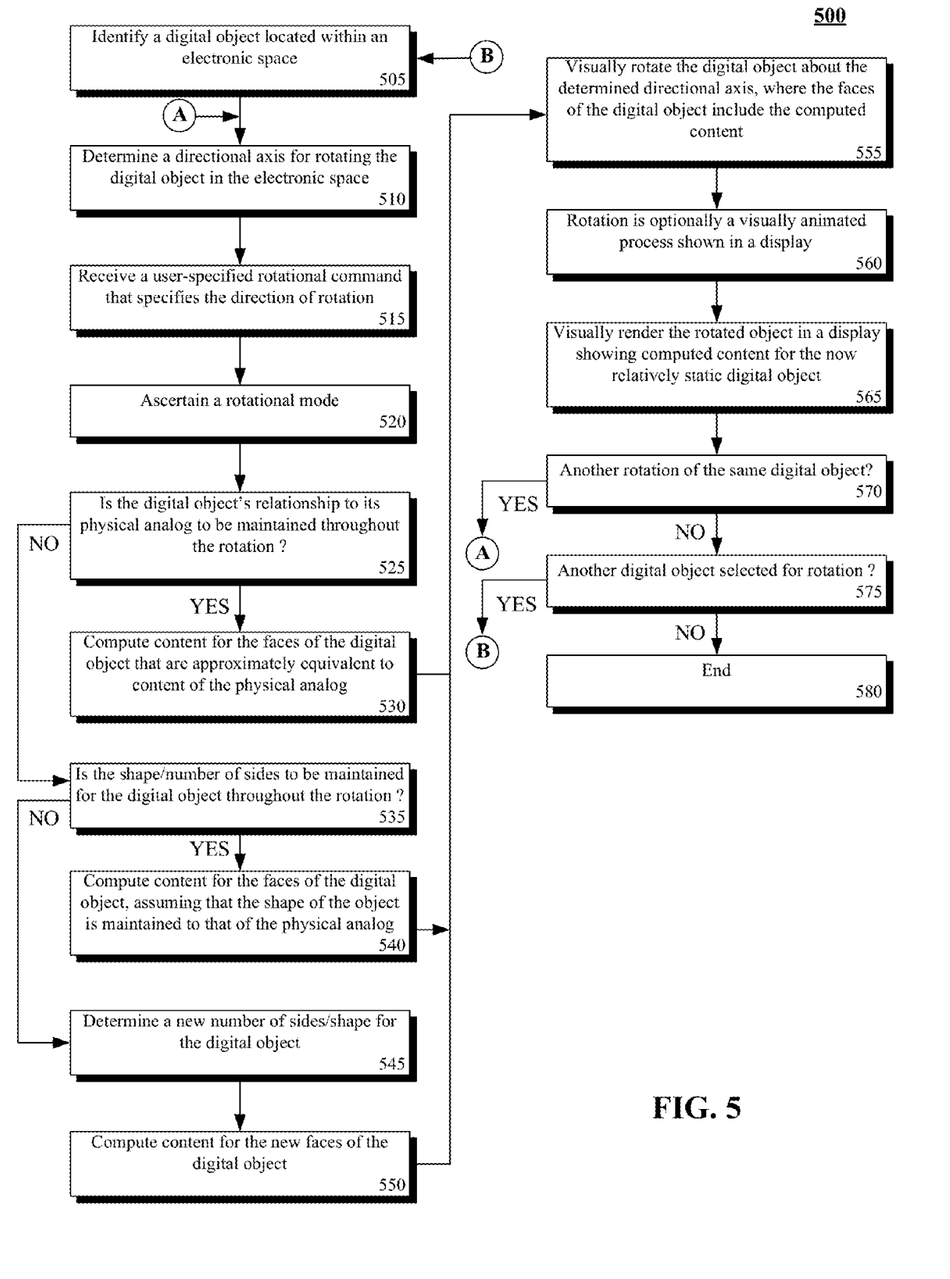
FIG. 5 is a flow chart of a method for presenting information in a rotationally dependent manner in accordance with an embodiment of the inventive arrangements disclosed herein.

FIG. 5 is a flow chart of a method 500 for presenting information in a rotationally dependent manner in accordance with an embodiment of the inventive arrangements disclosed herein. Method 500 can be performed in the context of system 100 or in the context of any other system allowing the display of rotationally dependent information. Additionally, method 500 can be performed in the context of GUI 220, GUI 320, or GUI 430 or in the context of any other GUI that supports the display of rotationally dependent information.

Method 500 can begin in step 505, where a user identifies a digital object located within an electronic space. In step 510, a user determines a directional axis on which to rotate the identified digital object within the electronic space. The system receives a user-specified command that specifies the direction of rotation for the digital object in step 515.

In step 520, the system ascertains which rotational mode is being used for the rotational command of step 515. A rotational mode can determine the rotationally dependent information for a digital object. Once the rotational mode is ascertained, then the system must determine if the rotational analogy between the digital object and its physical analog should be maintained throughout the rotation in step 525. If the analogy between the physical and digital object is to be kept, then step 530 occurs, in which the system computes the content for the digital object side.

If the analogy between the physical and digital is to be broken in step 525, then step 535 occurs, in which the system must determine if the shape and/or the quantity of sides of the digital object will change with the rotation. If the shape and/or quantity of sides are not impacted by the rotation, then step 540 occurs, in which the system computes the content for the digital object side. Should the system determine that either of these analogies to the physical analog is required to be broken in step 535, then the system proceeds to step 545, where the system must determine the new shape or quantity of sides for the digital object. Once that is complete, the system computes the content for the digital object side according to its determination from step 545 in step 550.

In step 555, the system renders a visual representation of the rotated digital object and the computed content according to its previous determinations. It is possible that the rotation of the digital object occurs as part of a visually animated process in step 560. Followed by step 565, in which the animated rotation results in a static display of the digital object and the content computed for the specified side is displayed.

In step 570, it is possible for the system to accept a user selection for another rotation of the digital object that is currently displayed. Should a user select to rotate the current digital object again, the system returns to and begins execution of this method at step 510. If a user does not want to rotate the current object again, it is possible that a different digital object could be selected for rotation, as shown in step 575. Should a user select another digital object to rotate, the system returns to and begins execution of this method at step 505. If rotation of another digital object is not desired, then the system proceeds to step 580, where the method ends.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method comprising:
   a computing device displaying one of a set of M content items within a display graphic element of a graphical user interface, wherein a sequential ordering exists among the set of M content items;
   the computing device detecting a rotation of a digital object along a directional axis of rotation, said digital object having N outwardly facing adjacent sides, each of the N adjacent sides, referred to as N sides, sharing a single line segment with each of two adjacent ones of the N sides relative to the directional axis, wherein one of the M content items is displayed in the graphic element for one of the N sides, wherein only one of the M content items is displayed in the display graphic element at a time, wherein a quantity of M is different from a quantity of N; and
   the computing device, in response to the detected rotation of the digital object along the directional axis, displaying a different one of the M content items within the display graphic element in accordance with the sequential ordering, wherein each sequential increment of the N sides per the rotation along the directional axis results in a corresponding sequential increment through the set of M content items; and
   the computing device repeating the detecting of the rotation and the displaying of the different one of the M content items, wherein for N repetitions of the repeating, the same one of the N sides is shown since the same side has repeated due to a cycling through of the N outwardly facing adjacent sides of the digital object but a different M content item is displayed in the graphical element due to M being different than the quantity of N causing a cycle through the sequence of M to be discordant with a cycling through the N sides of the digital object.

2. The method of claim 1, further comprising:
   the computing device displaying the digital object within the graphical user interface.

3. The method of claim 2, wherein the digital display element is a displayed graphic element of the graphical user interface distinct from the graphical user interface.

4. The method of claim 1, wherein only one of the M content items is displayed in the graphical user interface at a time.

5. The method of claim 2, wherein the graphical user interface displays the digital object in three dimensions.

6. The method of claim 1, wherein the graphical user interface is an interface for a software application running on the computing device, wherein the display graphic element is a user-selectable element shown within the graphical user interface prior to any of the content items being shown in the graphical user interface, wherein the content items are each information items specific to the display graphic element.

7. The method of claim 1, wherein the set of M content items corresponds to a set of data organized within a branching hierarchy, wherein the M content items of the set are each on different levels of the branching hierarchy, each of the different levels having a subordinate/superior relationship to an adjacent one of the levels.

8. The method of claim 7, wherein the rotating the digital object in one direction along the directional axis results in a sequential increment within the M content items of the set from a subordinate level to a superior level of the branching hierarchy, wherein rotating the digital object in an opposing direction along the directional axis results in a sequential decrement within the M content items of the set from a superior level to a subordinate level of the branching hierarchy.

9. The method of claim 1, wherein the M sets of content correspond to a set of data organized within a branching hierarchy, wherein the M sets of content are each on the same level of the branching hierarchy.

10. The method of claim 9, wherein the rotating the digital object in one direction along the directional axis results in a sequential increment within the M content items of the set from one of the content items on the same level to an adjacent one of the content items, wherein the rotating the digital object in an opposing direction along the directional axis results in a sequential decrement within the M content items of the set from one of the items on the same level to an adjacent item, said sequential increment and sequential decrement progressing through the sequential ordering in opposite directions.

11. The method of claim 1, wherein M is greater than N.

12. The method of claim 1, wherein the graphical user interface is for a game, wherein the display element is a game element, wherein the content items are each information items specific to the game element.

13. The method of claim 1, wherein the digital object is able to be rotated along different ones of a plurality of different directional axes, wherein each of the plurality of directional axes corresponds to a different set of a plurality of sets of content.

14. The method of claim 1, wherein the display graphical element is a popup of the graphical user interface.

15. The method of claim 1, wherein the computing device is one of a computer, a personal data assistant, a digital tablet, a mobile phone, a media player, and a video game device.

16. The method of claim 1, wherein the digital object is an object of a 3-Dimensional game.

17. The method of claim 16, wherein the object is usable in the 3-Dimensional game having a plurality of different game specific information items associated with it, wherein the M content items comprise the different game specific information items.

18. The method of claim 1, wherein the digital object is a three-dimensional object displayed in the graphical user interface, wherein the directional axis is a first plane for the three-dimensional object, wherein the digital object is also rotatable in a second plane for the three-dimensional object, wherein a different set of O content items that are sequentially ordered corresponds to rotations of the digital object in the second plane, wherein the first plane and the second plane are substantially orthogonal.

19. The method of claim 1, wherein a number of sides of the digital object is dependent on a direction of rotation along the directional axis.

20. The method of claim 1, further comprising:
   displaying a user selectable mechanism within the graphical user interface for immediately returning the digital object to a state of display that existed before the rotation.

21. The method of claim 1, wherein the graphical user interface indicates that the digital item is no longer rotatable in a direction along the axis once a terminal one of the M content items in the set is displayed in the display graphical element and no additional one of the M content items exists beyond the terminal one based on the sequential ordering of the set.

22. The method of claim 1, wherein each sequential decrement of the N sides per the rotation results in a corresponding sequential decrement through the set of M content items.

23. A computer program product comprising:
one or more non-transitory computer-readable storage devices;
program instructions, stored on at least one of the one or more storage devices for execution by one or more processors, to display one of a set of M content items within a display graphic element of a graphical user interface, wherein a sequential ordering exists among the set of M content items;
program instructions, stored on at least one of the one or more storage devices for execution by one or more processors, to detect a rotation of a digital object along a directional axis of rotation, said digital object having N outwardly facing adjacent sides, each of the N adjacent sides, referred to as N sides, sharing a single line segment with each of two adjacent ones of the N sides relative to the directional axis, wherein the digital object has N line segments along the directional axis, wherein one of the M content items is displayed in the graphic element for one of the N sides, wherein only one of the M content items is displayed in display graphic element at a time, N; and
program instructions, stored on at least one of the one or more storage devices for execution by one or more processors, to, in response to the detected rotation of the digital object along the directional axis, display a different one of the M content items within the display graphic element in accordance with the sequential ordering, wherein each sequential increment of the N sides per the rotation along the directional axis results in a corresponding sequential increment through the set of M content items.

24. The computer program product of claim 23, further comprising:
program instructions, stored on at least one of the one or more storage devices for execution by one or more processors, to display the digital object within the graphical user interface.

25. The computer program product of claim 24, wherein the digital display element is a displayed graphic element of the graphical user interface distinct from the graphical user interface.

26. The computer program product of claim 24, wherein each content item of the M sets of content has a semantic meaning unrelated to graphical properties needed to visually render the digital object within the graphical user interface.

27. The computer program product of claim 24, wherein the graphical user interface displays the digital object in three dimensions.

28. A computing device comprising:
one or more processors and one or more computer-readable memories;
program instructions, stored on at least one of the one or more computer-readable memories for execution by at least one of the one or more processors, to display one of a set of M content items within a display graphic element of a graphical user interface, wherein a sequential ordering exists among the set of M content items;
program instructions, stored on at least one of the one or more computer-readable memories for execution by at least one of the one or more processors, to detect a rotation of a digital object along a directional axis of rotation, said digital object having N outwardly facing adjacent sides, each of the N adjacent sides, referred to as N sides, sharing a single line segment with each of two adjacent ones of the N sides relative to the directional axis, wherein one of the M content items is displayed in the graphic element for one of the N sides, wherein only one of the M content items is displayed in the graphical user interface at a time, wherein a quantity of M is different from a quantity of N; and
program instructions, stored on at least one of the one or more computer-readable memories for execution by at least one of the one or more processors, to, in response to the detected rotation of the digital object along the directional axis, display different ones of the M content items within the display graphic element in accordance with the sequential ordering, wherein each sequential increment of the N sides per the rotation results in a corresponding sequential increment through the set of M content items.

29. A computer program product comprising:
one or more non-transitory computer-readable-storage mediums;
program instructions, stored on at least one of the one or more storage mediums for execution by one or more processors, to provide a graphical user interface for human to machine interactions, said graphical user interface comprising:
a digital object displayed in the graphical user interface, wherein the digital object has N outwardly facing adjacent sides, each of the N adjacent sides, referred to as N sides, sharing a single line segment with each of two adjacent ones of the N sides relative to the directional axis, wherein the digital object has N line segments along the directional axis, wherein one of the M content items is displayed in the graphic element for one of the N sides, wherein the digital object rotates;
a display graphic element for displaying one of a set of M content items, wherein a sequential ordering exists among the set of M content items, wherein a quantity of M is less than a quantity of N, wherein only one of the M content items is displayed in display the graphic element at a time; and
program instructions, stored on at least one of the one or more storage mediums for execution by one or more processors, to, in response to a detected rotation of the digital object within the graphical user interface, display different ones of the M content items within the display graphic element in accordance with the sequential ordering, wherein each sequential increment of the N sides per the rotation results in a corresponding sequential increment through the set of M content items; and
program instructions, stored on at least one of the one or more computer-readable memories for execution by at least one of the one or more processors, to repeat the detected rotation and the displaying of the different one of the M content items, wherein for N repetitions of the repeating, the same one of the N sides is shown since the same side has repeated due to a cycling through of the N outwardly facing adjacent sides of the digital object but a different M content item is displayed in the graphical element due to M being less than the quantity of N causing a cycle through the sequence of M to be discordant with a cycling through the N sides of the digital object.

30. The computer program product of claim 29, wherein the digital object is a three-dimensional object displayed in the graphical user interface, wherein the directional axis is a first plane for the three-dimensional object, wherein the digital object is also rotatable in a second plane for the three-dimensional object, wherein a different set of O content items that are sequentially ordered corresponds to rotations of the digital object in the second plane, wherein the first plane and the second plane are substantially orthogonal.

\* \* \* \* \*